E. WIARD.
Plow.
No. 216,772. Patented June 24, 1879.
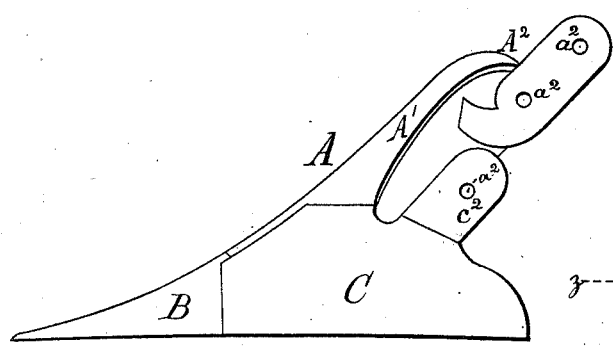
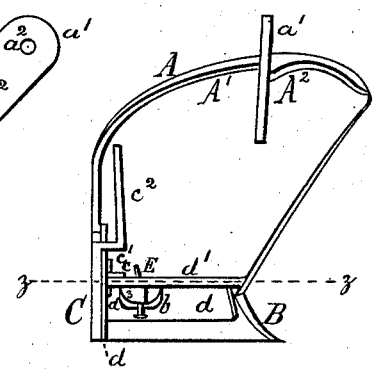
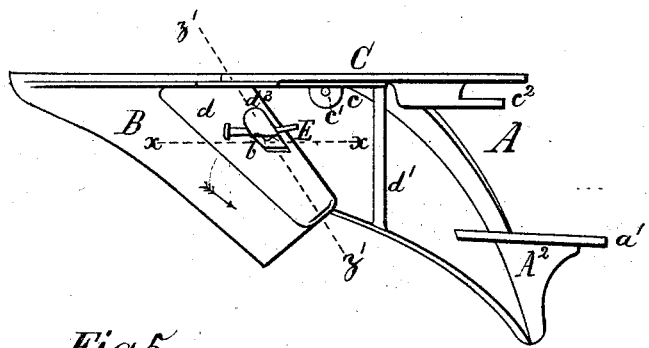
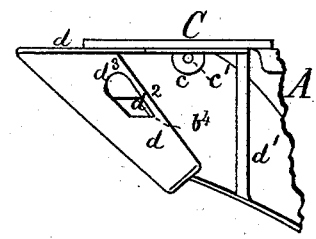
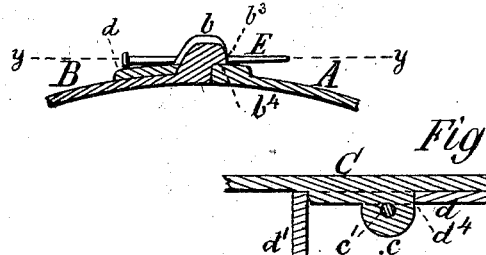
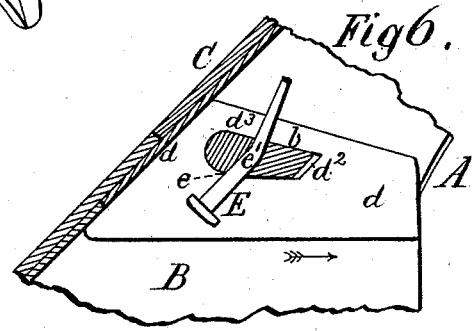
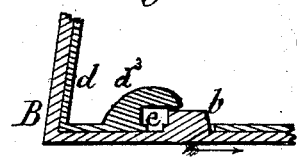
Witnesses:
G. H. Theodore Lang
J. P. Th. Lang
Inventor:
Edward Wiard
by Mason Fenwick & Lawrence
Attorneys

UNITED STATES PATENT OFFICE.

EDWARD WIARD, OF LITCHFIELD, MINNESOTA.

IMPROVEMENT IN PLOWS.

Specification forming part of Letters Patent No. 216,772, dated June 24, 1879; application filed January 31, 1879.

*To all whom it may concern:*

Be it known that I, EDWARD WIARD, of Litchfield, in the county of Meeker and State of Minnesota, have invented a new and useful Improvement in Plows, which improvement is fully described in the following specification and drawings, in which latter—

Figure 1 is a side elevation of the improved plow viewed from the land side. Fig. 2 is a rear elevation of the same. Fig. 3 is a bottom view of the same. Fig. 4 is a bottom detail view, the share and point being removed and a rear portion of the plow broken away. Fig. 5 is a section in the line $x\ x$ of Fig. 3, a portion of the plow being broken away. Fig. 6 is a section in the line $y\ y$ of Fig. 5, a portion of the plow being broken away. Fig. 7 is a section in the line $z\ z$ of Fig. 2, a portion of the plow being broken away. Fig. 8 is a section in the line $z'\ z'$ of Fig. 3, a portion of the plow being broken away.

My invention consists, first, in an angular inwardly-extended bracket cast on the upper edge of the detachable land-side, whereby a straight handle, or a handle without an angular bend at its lower end, may be fastened on the land-side of the plow, and at the same time the lower end of the handle thrown so far inward as to offer no obstruction to the passage of the plow through the earth on the land side.

It consists, secondly, in a handle-fastening bracket cast on the rear inward-extended portion of the top flange of the mold-board of the plow, and also upon the rear under portion of the mold-board, in such a manner that two bolt-holes for the reception of the handle-fastening bolts can be provided in the bracket, one above and the other below the flange, and thus the lower end of the mold-board handle can be fastened to the bracket in a very permanent manner without passing the bolts into the mold-board, and at the same time the lower end of the handle is brought up so high above the sole of the plow as to not offer such obstruction as would be liable to cause the plow to become clogged with dirt and other obstacles; and while this is the case the handle is thrown so far inward and backward from the delivery portion of the mold-board that the sod being turned over cannot come in contact with the handle before it is delivered from the mold-board. The handle thus applied can be made much shorter than heretofore, and being thus short the land-side handle, when it breaks off at the lower end, can be utilized by very little adaptation for a mold-board handle, and considerable waste thereby avoided.

The invention consists, thirdly, in a novel construction of the frog or support and the rear or detachable portion of the land-side, whereby the said rear or detachable portion of the land-side is easily and efficiently fastened to the land-side portion of the frog with the aid of an ordinary nail, and is prevented from working back and vibrating vertically.

It consists, fourthly, in a novel construction of the front part of the frog and the rear under portion of the combined share and point, whereby a very simple and effective means for uniting the share and point to the frog with an ordinary nail or its equivalent is provided.

In the drawings, A represents the mold-board of the plow; B, the detachable combined share and point, and C the detachable rear portion of the land-side. The mold-board A is provided with an inward top flange, $A^1$, and this flange is extended in nearly a V form at $A^2$ some distance farther inward and backward, at the point where the bracket or lug $a^1$ for the mold-board handle is cast upon the mold-board, in order to form a stay and support for said bracket. The bracket $a^1$ is in form of a flat plate, and it is cast on the under side of the mold-board just below the flange $A^1\ A^2$, and to the flange, as shown. It sits incliningly, and also a little oblique, with respect to the land-side of the plow, so as to afford a flat bearing for the lower outer side of the mold-board plow-handle, as represented. Two holes, $a^2$, one above and the other below the flange $A^1\ A^2$, are provided in the bracket for the reception of the bolts which fasten the handle in place.

The bracket $a^1$ is, by being located as described and shown, in relief from the mold-board, except at the points where it is united to it in the casting, and thus the bolts which fasten the handle have room enough without being passed through the mold-board; and in addition to this the handle of the plow can be quite short compared with other handles, as its lower end is terminated near the highest part of the mold-board, and thus, while expense is avoided, clogging also is prevented.

$d$ is an angular frog or support, to which the combined share and point B and the detachable portion C of the land-side are attached. This frog forms a permanent part of the mold-board, and may be cast with the same, as shown in the drawings.

The vertical or land-side portion of the frog is strengthened and stayed, and the mold-board also, by means of a transverse rod, $d^1$, which unites said vertical portion with the mold-board, as shown, and at the same time serves as the means for closing the rear end of a slot, $d^4$, in the vertical or land-side portion of the frog $d$, and thus acts as a stop or abutment to a fastening-lug, $c$, of the detachable portion C of the land-side. The said portion C of the land-side rests against the vertical or land-side portion of the frog $d$, and is fastened thereto by means of the long narrow lug $c$, which lug is formed on the detachable portion C of the land-side, and is passed horizontally through the oblong slot $d^4$ in the frog, and receives through its extended perforated portion a nail, $c^1$, which, by its taper form and contact with the inner face of the vertical part of the frog, draws and confines the land-side portion C firmly in place.

The lug $c$, being of considerable length, and its rear end abutting against the brace-rod $d$, makes a rigid connection of the land-side portion C with the frog $d$, and the land-side is prevented from slipping back and vibrating vertically, as might be the case were the parts not connected together by means such as I have devised.

On the upper rear edge of the portion C of the land-side an angular bracket or lug, $c^2$, is cast. This bracket or lug is set off from the land-side, and its base extends inward toward the mold-board, while its bolting portion inclines backward with a slight obliquity corresponding to the intended set of the land-side handle which is to be bolted to it. A hole, $a^2$, is formed in it for the reception of the bolt which fastens the handle in place. This construction of the bracket or lug $c^2$ for supporting the land-side handle on the land-side avoids the necessity of making a bend in the handle in order to make it convenient to the plowman, and have its lower end thrown inward far enough to prevent it coming in contact with the land side of the furrow while the plow is in use, and it also admits of the handle being made somewhat shorter than usual.

Both of the handles under my construction will be much shorter than those of ordinary plows, and thus when made of metal will cost less than those in other plows having metal handles.

The combined share and point B rests against the forward portion of the frog $d$ in the manner shown, and is fastened thereto on the mold-board side by means of an overlapping or hook-like lug, $b$ $b^3$, of the share and point B, which lug is passed through a tapering slot, $d^2$, in the frog $d$, and, by means of the hook portion $b^3$, a nail, E, of tapering form, and a lug, $d^3$, of the frog $d$, in conjunction with the overlapped portion $b^4$ of the frog at the narrower portion of the slot $d^2$, is held in position upon the frog and in proper relation to the mold-board. The lugs $b$ $b^3$ and $d^3$ are so formed as to provide between the portions $b$ and $d^3$ a deflecting and tapering passage, $e$, as seen in Fig. 8, into which the nail E is inserted, and from which it is prevented slipping laterally and downwardly by the lugs.

The passage $e$, as shown in Fig. 6, is deflected, as at $e'$, from its straight course, and by this means the nail E when being driven "home" is bent as represented in said figure, and thus it is prevented from casually slipping backward toward the point of the plow, and thereby allowing the share and point to get loose, the movement of the plow when in use also acting to prevent the displacement of the nail.

It will be seen that the nail, by reason of its tapering form, forces the lug $b$ $b^3$ away from the lug $d^3$ in the direction indicated by the arrows, and causes the hooking portion $b^3$ to overlap upon the frog at $b^4$, and by this means the share B is drawn up snugly to the mold-board and land side of the frog, and securely confined upon the frog.

It will also be seen that the lug $c$ of the detachable portion of the land-side is of considerable length and fills the slot $d^4$ in the land-side portion of the frog, and that the rear end of this lug abuts against the land-side end of the brace-rod $d^1$, which rod is attached by its said end to the land-side portion of the frog, and by its other end to the mold-board A; and thus while the mold-board and land-side are firmly braced and held in their proper relative positions, the detachable portion C of the land-side is prevented from slipping back and vibrating vertically, and at the same time ready access to the fastening-nails is afforded; and, finally, by constructing the lugs $b$ $b^3$ and $d^3$ in the manner described, and making the slot $d^2$ tapering, and providing a passage, $e$ $e'$, for the reception of a nail, as shown, a farmer can at all times securely fasten the parts together at a trifling expense whenever circumstances require him to do so. This would not be the case if the construction were such as to require a special construction of key-fastening to replace a key which may have been lost or destroyed.

The plow herein described belongs to a class known as "cast plows," and it is intended to provide the plow with a proper standard, as usual.

I do not broadly claim fastening parts of a plow by means of slots and keys. Neither do I claim, broadly, providing brackets or lugs on the mold-board and land-side for fastening the plow-handles to these parts; but

What I claim is—

1. The land-side portion C, having the angular bracket or lug $c^2$ cast upon its upper edge in the manner shown and described, whereby the lower end of a straight handle is fastened in a position some distance inward from the land-side, as set forth.

2. The mold-board having its flange $A^1$ extended inward at $A^2$, and with the bracket or lug $a^1$ cast on its under side and to the part $A^2$ of the flange $A^1$, substantially in the manner and for the purpose described.

3. The combination of the frog $d$, provided with an oblong slot, $d^4$, brace $d^1$, mold-board A, and detachable portion C of the land-side, provided with an oblong lug, $c$, for the reception of a nail, substantially as and for the purpose described.

4. The combination of the frog $d$, having a slot, $d^2$, and lug $d^3$, and the combined point and share B, having a lug, $b\ b^3$, and the deflected passage $e\ e'$, and nail E, substantially as and for the purpose described.

5. The combination of the lug $b\ b^3$ on the share and lug $d^3$ on the frog, forming a deflecting-aperture, $e$, for the reception, bending, and retention of the nail E, substantially as described.

EDWARD WIARD.

Witnesses:
S. W. LEAVETT,
C. H. BIGELOW.